Nov. 7, 1939.　　　C. E. TACK　　　2,179,387
BRAKE ARRANGEMENT
Filed May 19, 1938　　2 Sheets-Sheet 1
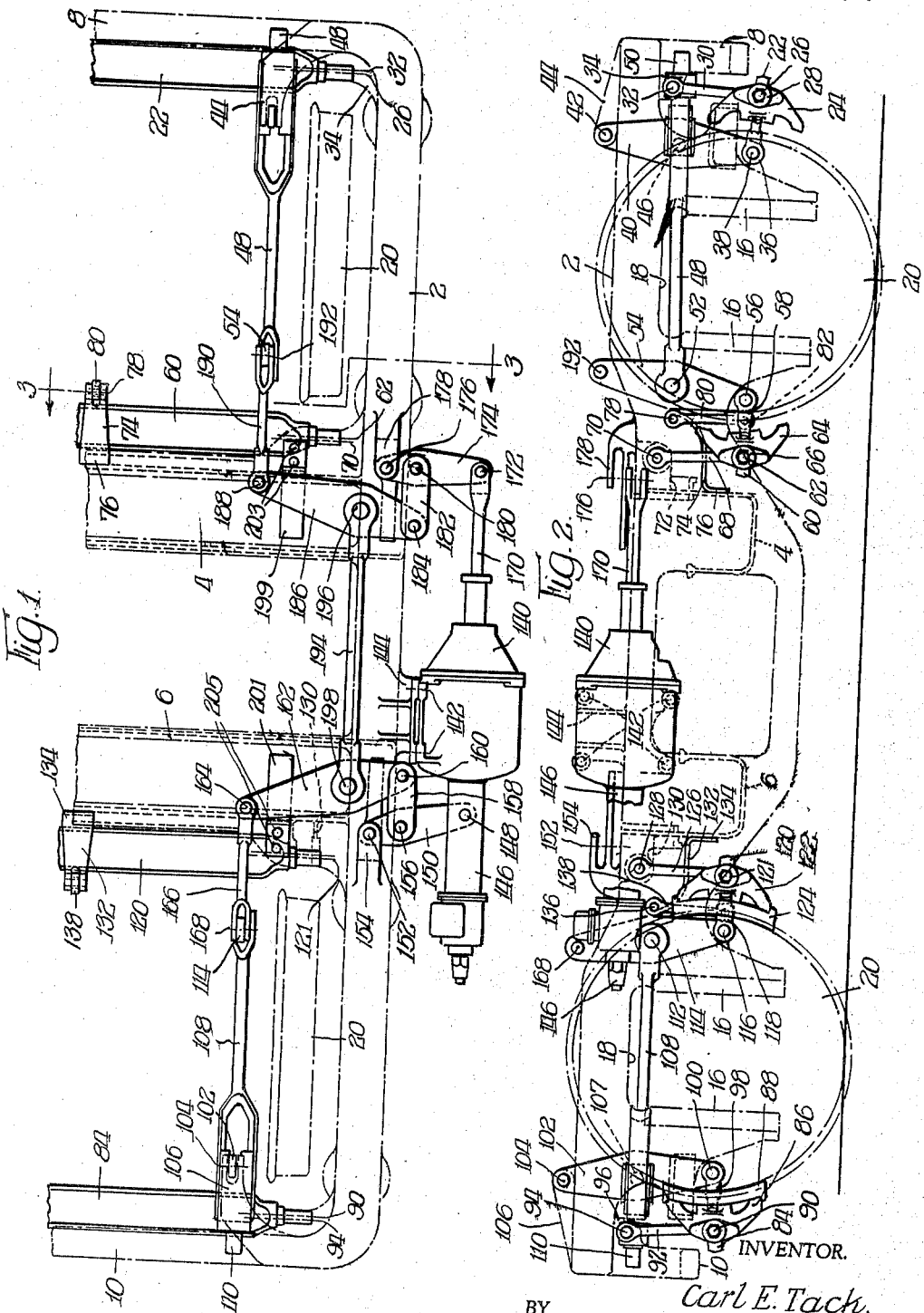
INVENTOR.
Carl E. Tack,
BY Arin O. B. Garner
ATTORNEY.

Nov. 7, 1939.  C. E. TACK  2,179,387
BRAKE ARRANGEMENT
Filed May 19, 1938  2 Sheets-Sheet 2
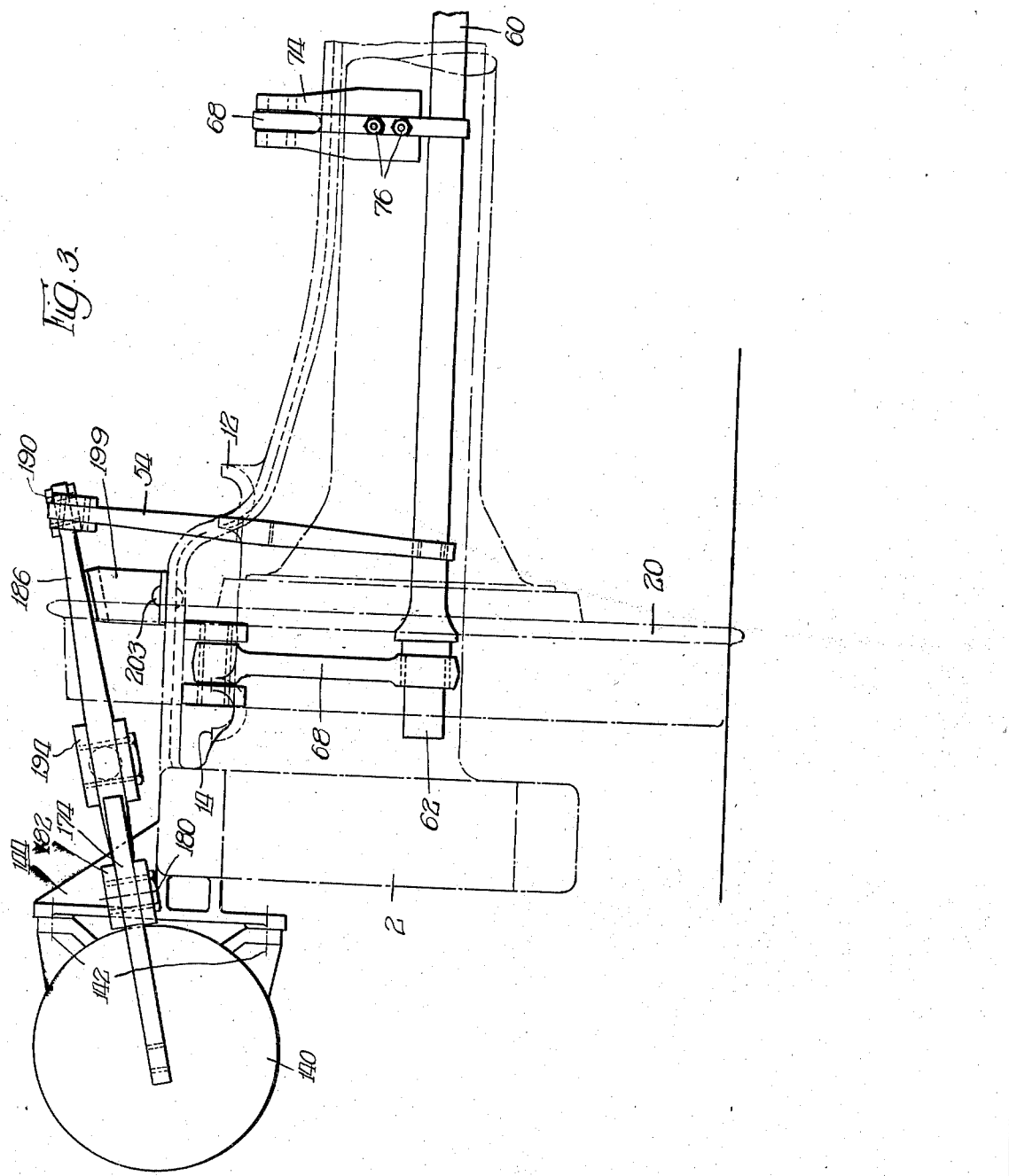
INVENTOR.
Carl E. Tack,
BY Orin O. B. Garner
ATTORNEY.

Patented Nov. 7, 1939

2,179,387

UNITED STATES PATENT OFFICE 2,179,387

BRAKE ARRANGEMENT

Carl E. Tack, Chicago, Ill., assignor to American Steel Foundries, Chicago, Ill., a corporation of New Jersey Application May 19, 1938, Serial No. 208,802

27 Claims. (Cl. 188—56)

My invention relates to brake rigging of the so-called unit cylinder type wherein the power means for operating the brake rigging is mounted on the truck.

An object of my invention is to devise a novel form of brake rigging particularly suitable for affording maximum side bearing clearance while, at the same time, comprising a very compact brake arrangement of relatively simple design and requiring a minimum of space.

Another object of my invention is to devise a clasp brake arrangement of the unit cylinder type wherein the power means will be mounted on the side rails for operation of the rigging and wherein actuation of the rigging will be through horizontal cylinder levers at each side of the truck.

My invention further contemplates an arrangement whereby the effective length of the cylinder levers may be increased, thus providing an additional side bearing clearance for the connecting rod between said cylinder levers.

Figure 1 is a top plan view of a car truck and brake structure embodying my invention;

Figure 2 is a side elevation of the truck and brake structure shown in Figure 1; and Figure 3 is a sectional view through the truck and brake structure, the section being taken substantially in the transverse planes indicated by the line 3—3 of Figure 1.

In each of the figures certain details are omitted where better shown in other figures.

Describing the structure in more detail, the truck arrangement is of generally familiar type having the side rail 2, the spaced integral transoms 4 and 6 and the integrally formed end rails 8 and 10, said transoms forming support for the usual swinging bolster (not shown) which may be hung therebetween from the seats 12 and 14 as best seen in the view of Figure 3. The side rails have the columns 16, 16 forming the openings 18, 18 for the usual method of connection to journal boxes (not shown), said boxes supporting the journal ends of the wheel and axle assemblies 20, 20.

From a consideration of Figure 3 and the location of the seats 12 and 14, it will be apparent to those skilled in the art that the truck structure permits exceptionally wide spread between the side bearings, thus supplying added stability to the truck and car body.

The brake arrangement comprises the beam 22 (Figures 1 and 2, right) carrying at each end a brake head 24 pivotally mounted as at 26 on the trunnion end of said beam, said head being properly supported on said trunnion end by balancing means 28 of well known form. At the pivotal point 26 is also connected the lower end of the hanger 30 whose upper end is pivotally hung as at 32 from the bracket 34 integrally formed with the truck frame at the juncture of the side frame 2 and the end rail 8. Adjacent each end of the beam 22 is secured a fulcrum 36, and the outer end of said fulcrum has a pivotal connection as at 38 to the lower end of the dead truck lever 40 whose upper end is pivotally hung as at 42 from the in-turned bracket 44 which is integrally formed with the frame inwardly of the junction of the end rail 8 and the side frame 2. Intermediate its ends as at 46 the dead truck lever 40 has a pivotal connection with the pull rod 48, said connection being made adjustable as by means of the manual slack adjuster 50. The opposite end of the pull rod has a pivotal connection as at 52 to the live truck lever 54 whose lower end is pivotally connected as at 56 to the fulcrum 58 carried by the beam 60. The trunnion end of the beam 60 provides a pivotal support as at 62 for the brake head 64 which is properly positioned thereon by the balancing means 66. At the pivotal point 62 is likewise connected the lower end of the hanger 68, the upper end of which is pivotally hung as at 70 from the bracket 72 integrally formed with the gusset structure at the juncture of the side frame 2 with the transom 4. Balancing means for the beam 60 is in the form of the spring bracket 74 secured as at 76 to the transom 4, said spring bracket having a pivotal connection as at 78 to the link 80, the lower end of said link having a pivotal connection as at 82 to a fulcrum at the mid-point of the beam 60.

The brake parts at the opposite end of the truck are the same, with the beam 84 (Figures 1 and 2, left) carrying the brake head 86 and supporting a brake shoe 88 in alignment with the adjacent wheel, the head being pivotally carried as at 90 on the trunnion end of said beam with the hanger 92 likewise connected at the pivotal point 90 and having its upper end hung as at 94 from the bracket 96. The brake beam fulcrum 98 is connected as at 100 to the lower end of the dead truck lever 102, the upper end of which is pivotally hung as at 104 from the inturned bracket 106. Intermediate the ends of the dead truck lever 102 as at 107 is connected the pull rod 108, the connection thereto being made adjustable as by means of the manual slack adjuster 110. The opposite end of the pull rod 108 has a pivotal connection as at 112 to the live truck lever 114, the lower end of which has a pivotal connection as at 116 to the fulcrum 118 on the beam 120, said beam carrying on its trunnion end as at 121 the head 122 with its associated shoe 124 arranged in alignment with the adjacent wheel. At the pivotal point 121 is also connected the lower end of the hanger 126, the upper end of which is pivotally supported as at 128 from the bracket 130. Resilient balancing means for the beam 120 is in the form of the spring bracket 132 secured as at 134 to the transom 6, said spring bracket 132 having a connection at its outer end as at 136 to the upper end of the link 138 whose lower end is pivotally connected to the fulcrum at the middle of the beam 120.

Operating means for the brake rigging is in the form of the power means or brake cylinder 140 mounted on each side rail adjacent the transverse center line of the truck, said power means being secured as at 142, 142 to the bracket 144 integrally formed on the side rail 2. On the power means or brake cylinder 140 is mounted the automatic slack adjuster 146, said slack adjuster having an adjustable connection as at 148 to the auxiliary lever 150, said auxiliary lever being fulcrumed at its inner end as at 152 from the bracket 154 integrally formed on the top of the side frame 2. Intermediate the ends of the auxiliary fulcrum lever 150 is pivotally connected as at 156 the link 158, the opposite end of said link having a pivotal connection as at 160 to the outer end of the dead cylinder or slack adjuster lever 162 and the inner end of the slack adjuster lever has a pivotal connection as at 164 to the pull rod 166 whose opposite end is pivotally connected as at 168 to the upper end of the live truck lever 114.

The brake cylinder piston rod 170 has a pivotal connection as at 172 to the auxiliary lever 174, the inner end of which is fulcrumed as at 176 from the bracket 178 integrally formed on the top of the side frame 2. Intermediate its ends as at 180 the auxiliary lever 174 is pivotally connected to the link 182, the opposite end of said link having a pivotal connection as at 184 to the live cylinder lever 186, the opposite end of said cylinder lever having a pivotal connection as at 188 to the pull rod 190, said pull rod being connected at its other end as at 192 to the upper end of the live truck lever 54.

The movement of the live and dead cylinder levers is synchronized by a connection intermediate their ends in the form of the pull rod 194, one end of which is pivotally connected as at 196 to the live cylinder lever 186 and the other end of which is pivotally connected as at 198 to the dead cylinder lever 162. It may be noted that the connection between the live and dead cylinder levers, that is the pull rod 194, is located adjacent the side rail 2 outwardly of the position it might otherwise normally assume in order to afford maximum clearance for the side bearing. Stability is afforded the inner ends of the live and dead cylinder levers by the brackets 199 and 201 secured as at 203 and 205 from the transoms 4 and 6 respectively adjacent the inner ends of said levers.

In operation, assuming the parts to be in released position, actuation of the power means 140 causes movement of the piston 170 to the right (Figures 1 and 2), thus rotating the dead auxiliary lever 174 in a counter-clockwise direction and in turn rotating the live cylinder lever 186 in a clockwise direction and applying braking force through the pull rod 190 to the live truck lever 54 to actuate the braking means at one end of the truck in well known manner. Actuation of the live cylinder lever 186 as previously described applies linear movement to the right to the pull rod 194, thus rotating the dead slack adjuster lever or dead cylinder lever 162 in a clockwise direction about the fulcrum 169 at its outer end and through the pull rod 166 applying braking force to the live truck lever 114 and actuating the braking means at the other end of the truck likewise. Release of the power means causes the various parts to move in directions reverse to those already described, thus releasing the brakes.

It is to be understood that I do not wish to be limited by the exact embodiment of the device shown which is merely by way of illustration and not limitation as various and other forms of the device will of course be apparent to those skilled in the art without departing from the spirit of the invention or the scope of the claims.

I claim:

1. In a four wheel railway car truck, a frame having side rails, power means and slack adjuster means on each of said rails, supporting wheel and axle assemblies, braking means for said wheels including a live truck lever adjacent each wheel, and connections between said power means and said braking means at each side of the truck, said connections comprising auxiliary levers fulcrumed at their inner ends from said side rail and connected at their outer ends to opposite ends of said power means, a dead cylinder lever having its outer end connected to one of said auxiliary levers and its inner end connected to one of said truck levers, and a live cylinder lever having its outer end connected to the other auxiliary lever, a point intermediate its ends connected to the other cylinder lever and its inner end connected to said other live truck lever.

2. In a railway truck, a frame having side rails, a brake cylinder on each of said rails, supporting wheel and axle assemblies, braking means for each assembly including brake beams supported at each side thereof and a live lever adjacent each wheel, and connections between the power means and the live levers at each side of the truck in the form of live and dead cylinder levers connected at their inner ends to said live levers, connected intermediate their ends to each other and at their outer ends to fulcrum levers respectively, one of said fulcrum levers having its inner end connected to the adjacent side rail and its outer end connected to the piston of the adjacent cylinder, and the other of said fulcrum levers having its inner end connected to said side rail and its outer end adjustably connected to the opposite end of said cylinder.

3. In a railway car truck, a frame, power means on each side of said frame, spaced wheel and axle assemblies, braking means for said assemblies including a live truck lever adjacent each wheel, and connections between said power means and said live levers, said connections comprising live cylinder levers connected to the truck levers at one end of the truck, dead cylinder levers connected to the truck levers at the other end of the truck, connections between said cylinder levers at each side of the truck, pairs of auxiliary levers fulcrumed from said frame and connected respectively at opposite ends of each power means, and operative connections between said pairs of cylinder levers and said pairs of auxiliary levers at each side of said frame.

4. In a railway car truck, a frame, power means thereon at opposite sides thereof, spaced wheel and axle assemblies, braking means for said assemblies including a live truck lever adjacent each wheel, and connections between said power means and said braking means at each side of said truck, said connections comprising interconnected live and dead cylinder levers connected to said live truck levers at opposite ends of the truck, and operative connections between said cylinder levers and the opposite ends of said power means, said operative connections comprising dead auxiliary levers fulcrumed from said frame and connected at their outer ends respectively to opposite ends of said power means, and connections between said auxiliary levers and said cylinder levers.

5. In a railway car truck, a frame having side rails, power means mounted on each of said rails, spaced wheel and axle assemblies in supporting relation to said frame, braking means for said assemblies including a live truck lever adjacent each wheel, and operative connections between the braking means and the power means on each side of said truck, said operative connections including a pair of fulcrum levers connected to opposite ends of said power means, a dead cylinder lever connected to one of said fulcrum levers, a live cylinder lever connected to the other of said fulcrum levers and to said first mentioned cylinder lever, and connections between said cylinder levers and said live truck levers respectively.

6. In a railway car truck, a frame, power means and slack adjusting means mounted on opposite sides thereof, supporting wheel and axle assemblies, braking means for each assembly including brake beams supported at each side thereof and a live truck lever adjacent each wheel, and operative connections between said braking means and said power means at each side of the truck in the form of cylinder levers connected at their inner ends to said live truck levers, connected intermediate their ends to each other and at their outer ends to points intermediate the ends of fulcrum levers respectively, said fulcrum levers having their inner ends connected to said frame and their outer ends connected respectively to said slack adjusting means and to said power means.

7. In a railway car truck, a frame, power means and slack adjuster means mounted on each side thereof, supporting wheel and axle assemblies, braking means associated with each of said assemblies and including a live truck lever adjacent each wheel thereof, and connections between the power means and the live truck levers at each side of the truck in the form of interconnected live and dead cylinder levers having their inner ends connected to said live truck levers and their outer ends connected to spaced auxiliary levers, said auxiliary levers having their inner ends fulcrumed from said frame and their outer ends respectively connected to said power means and said slack adjuster means.

8. In a railway car truck, a frame, power means and slack adjusting means mounted on opposite sides thereof, supporting wheel and axle assemblies, braking means for each assembly including brake beams supported at each side thereof and a live truck lever adjacent each wheel, and operative connections between said braking means and said power means at each side of the truck in the form of cylinder levers connected at their inner ends to said live truck levers, connected intermediate their ends to each other and at their outer ends to auxiliary levers, said auxiliary levers being fulcrumed from said frame and connected respectively to said power means and said slack adjusting means.

9. In a railway truck, a frame having side rails and spaced transoms, power means on each side rail, supporting wheel and axle assemblies, braking means for each assembly including brake beams supported at each side thereof and a live truck lever adjacent each wheel, and connections between said power means and the live truck levers at each side of the truck in the form of auxiliary levers fulcrumed from the side rail and connected at their outer ends to opposite ends of the adjacent power means, interconnected cylinder levers connected at their inner ends to said truck levers and at their outer ends to said auxiliary levers, and means on each of said transoms for supporting the inner end of the adjacent cylinder lever.

10. In a railway car truck, a frame having side members, spaced wheel and axle assemblies, braking means for said assemblies including a live truck lever adjacent each wheel, power means on the opposite sides of said frame, and operative connections between said power means and said braking means, said connections comprising dead auxiliary levers fulcrumed from said frame and connected to opposite ends of each of said power means, and interconnected live and dead cylinder levers connected at their outer ends to said auxiliary levers and at their inner ends to said live truck levers for the power means at each side of said truck.

11. In a railway car truck, a frame, power means and slack adjuster means mounted on each side thereof, spaced wheel and axle assemblies, braking means for said assemblies including a live truck lever adjacent each wheel, and operative connections between the truck levers and the power means at each side of the truck, said operative connections comprising interconnected live and dead cylinder levers connected at their inner ends to said live truck levers respectively, auxiliary levers fulcrumed from said frame and connected respectively to said power means and to said slack adjuster means, and operative connections between said cylinder levers and said auxiliary levers respectively.

12. In a railway car truck, a frame, power means on each side thereof, spaced wheel and axle assemblies in supporting relation to said frame, braking means for said assemblies including a live truck lever adjacent each wheel, and connections between said power means and said live truck levers at each side of the truck, said connections comprising a dead auxiliary lever connected to the piston of said power means, a dead auxiliary lever adjustably connected to the opposite end of said power means, interconnected live and dead cylinder levers connected to said live truck levers, and operative connections between said cylinder levers and said auxiliary levers respectively.

13. In a four wheel railway car truck, a frame, power means on each side thereof adjacent the transverse center line, supporting wheel and axle assemblies, braking means for each of said assemblies including brake beams at each side thereof and a live truck lever adjacent each wheel, and connections between said braking means and the power means at each side of said truck in the form of interconnected cylinder levers connected at their inner ends to the live truck levers at opposite ends of the truck, and fulcrum levers having their outer ends connected to opposite ends of said power means and points intermediate their ends connected to said cylinder levers respectively.

14. In a four wheel railway car truck, a frame, power means on each side thereof adjacent the transverse center line, supporting wheel and axle assemblies, braking means for each of said assemblies including brake beams at each side thereof and a live truck lever adjacent each wheel, and connections between said braking means and the power means at each side of said truck in the form of interconnected cylinder levers connected at their inner ends to the live truck levers at opposite ends of the truck, and fulcrum levers interconnected between said cylinder levers and opposite ends of said power means, the connection between one of said fulcrum levers and said power means being automatically adjustable.

15. In a railway car truck, a frame, power means on each side thereof, spaced wheel and axle assemblies, braking means for each assembly including brake beams supported at each side thereof, dead truck levers fulcrumed from one beam and live truck levers fulcrumed from the other beam adjacent the respective wheels of said assembly, and connections between the power means and the live truck levers at each side of the truck in the form of fulcrum levers connected at opposite ends of said power means, and interconnected cylinder levers having their inner ends connected to the live truck levers at opposite ends of the truck and having their outer ends connected to said fulcrum levers respectively.

16. In a railway car truck, a frame, power means thereon at opposite sides thereof, spaced wheel and axle assemblies, braking means for said assemblies including a live truck lever adjacent each wheel, and connections between said power means and said braking means at each side of said truck, said connections comprising interconnected live and dead cylinder levers connected to said live truck levers at opposite ends of the truck, and operative connections between said cylinder levers and the opposite ends of said power means, said operative connections each comprising a dead auxiliary lever.

17. In a railway truck, a frame having side rails and spaced transoms, power means on each side rail, supporting wheel and axle assemblies, braking means for each assembly including a live truck lever adjacent each wheel, and connections between said power means and the live truck levers at each side of the truck in the form of a pair of interconnected cylinder levers connected at their inner ends to said truck levers and at their outer ends to auxiliary levers, said auxiliary levers being fulcrumed from said side rail and connected at their outer ends to opposite ends of said power means.

18. In a railway car truck, a truck frame comprising a side rail, wheel and axle assemblies, braking means for said assemblies including a live and a dead lever adjacent each wheel, and actuating means for said braking means in the form of power means secured on said side rail, dead levers connected at the opposite ends of said power means, and live and dead auxiliary cylinder levers connected to each other and connected between said auxiliary levers and said live truck levers respectively.

19. In a railway car truck, a frame, spaced wheel and axle assemblies, braking means for said assemblies including a live truck lever adjacent each wheel, and actuating means for said braking means including power means mounted on said frame, auxiliary levers fulcrumed from said frame and connected to opposite ends of said power means, and interconnected live and dead cylinder levers connected respectively between said auxiliary levers and said live truck levers.

20. In a four wheel railway car truck, a frame having side rails, power means and slack adjuster means on each of said rails, supporting wheel and axle assemblies, braking means for said wheels including a live truck lever adjacent each wheel, and connections between said power means and said braking means at each side of the truck, said connections comprising a pair of auxiliary levers fulcrumed from the side rail and connected respectively at opposite ends of said power means, and live and dead cylinder levers connected respectively between said auxiliary levers and said live truck levers.

21. In brake rigging for a railway car truck, a frame having a side member, supporting wheel and axle assemblies, brake means for each assembly including a live truck lever adjacent each wheel, interconnected live and dead cylinder levers connected respectively to said live truck levers, and means for actuating said cylinder levers, said actuating means including a cylinder mounted on said side member, dead levers fulcrumed from said frame and connected at opposite ends of said cylinder, and connections between said dead levers and said cylinder levers respectively.

22. In brake rigging for a railway car truck, a truck frame including a side member, spaced supporting wheel and axle assemblies, power means mounted on said member, and brake rigging associated with said assemblies and comprising a live truck lever adjacent each wheel, interconnected live and dead cylinder levers connected to said live levers respectively, and dead levers fulcrumed from said frame at their inner ends with their outer ends connected respectively at opposite ends of said power means, and points intermediate their ends connected respectively to said cylinder levers.

23. In a brake rigging for a railway car truck, a frame having a side member, power means supported thereon, supporting wheel and axle assemblies, braking means associated with said assemblies and including a live truck lever adjacent each wheel, connections between said live truck levers and said power means in the form of dead auxiliary levers fulcrumed from said side member and connected at opposite ends of said power means, and interconnected live and dead cylinder levers connected respectively at their outer ends to said dead auxiliary levers and at their inner ends to said live truck levers.

24. In a railway car truck, a frame having a side member, power means supported on said side member, spaced wheel and axle assemblies, braking means for said wheels including a live truck lever adjacent each wheel, connections between the adjacent live truck levers and said power means in the form of dead levers fulcrumed from said side member and connected at opposite ends of said power means, and interconnected live and dead cylinder levers connected respectively at their inner ends to said live truck levers and at their outer ends to said fulcrumed levers.

25. In a railway car truck, a frame having a side member, power means thereon, spaced wheels, braking means associated therewith including a live lever adjacent each wheel, connections between said power means and said braking means in the form of dead levers connected at opposite ends of said power means, and live and dead cylinder levers connected to each other and connected respectively between said live truck levers and said dead levers, one of said dead levers being automatically adjustable.

26. In brake rigging for a railway car, a truck frame, power means mounted on the side thereof, supporting wheels, braking means associated with said wheels comprising a live lever adjacent each wheel, and connections between said power means and said live levers in the form of auxiliary levers connected at opposite ends of said power means and fulcrumed from said frame, and interconnected live and dead cylinder levers connected respectively between said auxiliary levers and said live levers, one of said auxiliary levers being automatically adjustable.

27. In a railway car truck, a frame, power means mounted on the side thereof, supporting wheels, braking means for the wheels including a live lever adjacent each wheel, and operative connections between said power means and said live levers including interconnected live and dead cylinder levers connected at their inner ends to said live truck levers and connected at their outer ends to auxiliary levers, said auxiliary levers being fulcrumed from said frame and connected at opposite ends of said power means, one of said auxiliary levers being automatically adjustable.

CARL E. TACK.